W. H. HEFFLEY.

Machine for Turning Axles.

No. 6,615. Reissued Aug. 24, 1875.

Witnesses:

Donn Twitchell.

Hill & Dodge

Inventor:

W. H. Heffley.

by Dodge & Sons

Attys.

N. PETERS, PHOTO-LITHOGRAPHER, WASHINGTON, D. C.

UNITED STATES PATENT OFFICE.

WILLIAM H. HEFFLEY, OF ROCHESTER, INDIANA, ASSIGNOR, BY MESNE ASSIGNMENTS, TO WILLIAMS, WHITE & CO., OF MOLINE, ILLINOIS.

IMPROVEMENT IN MACHINES FOR TURNING AXLES.

Specification forming part of Letters Patent No. 106,364, dated August 16, 1870; reissue No. 6,615, dated August 24, 1875; application filed May 21, 1875.

*To all whom it may concern:*

Be it known that I, WILLIAM H. HEFFLEY, of Rochester, in the county of Fulton and State of Indiana, have invented certain new and useful Improvements in Machines for Turning Axles; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will now proceed to describe it.

This invention has for its object the construction of a machine for turning the ends of axle-trees, so that they will correspond exactly with the thimbles or spindles into which they are to be fitted; and the invention consists of one or more levers carrying a cutter to operate on the axle, which cutter is controlled in its cutting by having the lever at the opposite end bearing against the inner face of a thimble, said levers being so mounted as to revolve around the axle, and at the same time move longitudinally; and it further consists in certain details of mechanism, all as hereinafter more fully described.

Figure 1:
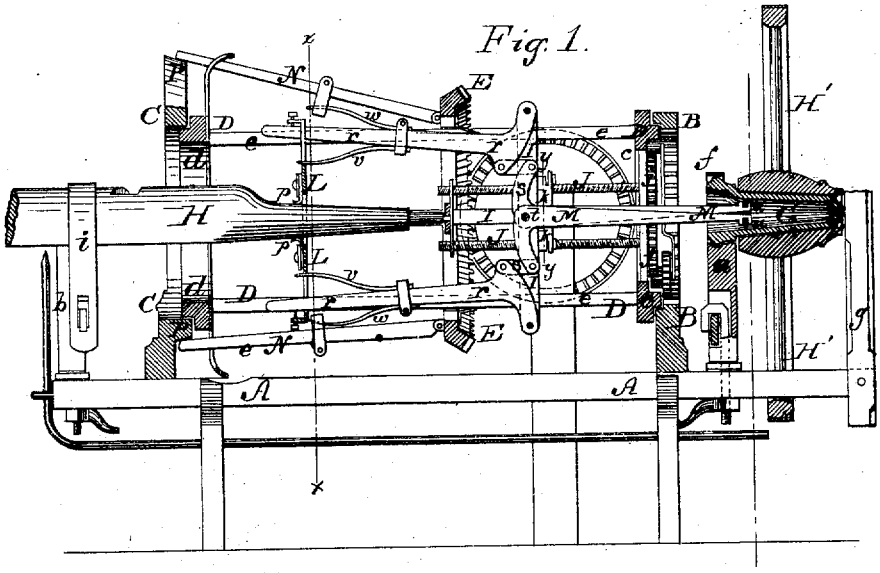
Figure 2:
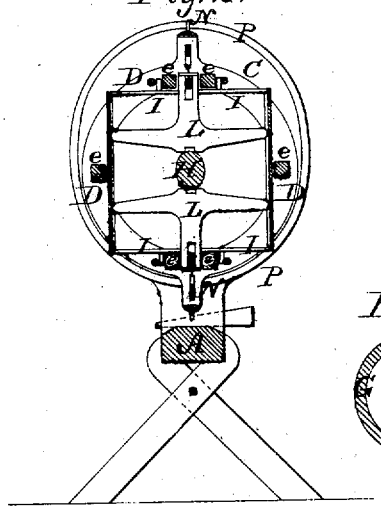
Figure 3:
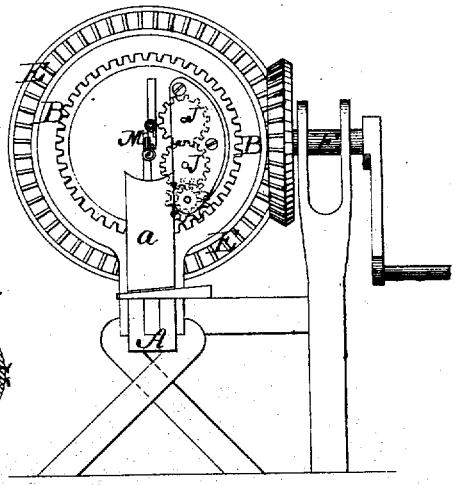
Figure 4:
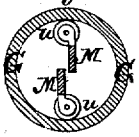
Figure 5:
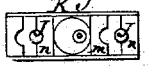

Figure 1 represents a plan or top view, partly in section, of my improved machine for turning axle-trees. Fig. 2 is a vertical transverse section of the same, taken on the plane of the line *x x*, Fig. 1. Fig. 3 is an end elevation of the same. Fig. 4 is a detail transverse section, on an enlarged scale, of the thimble and spring-arms within it. Fig. 5 is a detail vertical transverse section of the machine, taken on the plane of the line *y y*, Fig. 1.

Similar letters of reference indicate corresponding parts.

A in the drawing represents the frame of my improved machine. Upon it are secured two main standards, *a* and *b*, one near each end, and between them two vertically-projecting rings, B and C, as shown. The rings B C serve as bearings for ends *c d* of a rotary frame, D, that is hung horizontally in them. The frame D consists of the end pieces *c d*, and of horizontal rods *e e*, which connect the same at their outer parts. It carries a large bevel-gear wheel, E, which receives motion from a driving-shaft, F, that is hung in the frame A. The shaft F may be revolved by muscular or other suitable power. Upon the front standard *a* is secured the thimble G, which is held down by a strap, *f*, and which may be further supported by an additional standard, *g*. The wheel H′ may be fitted upon the thimble, if desired, but is not absolutely required. The strap *f* can be vertically adjusted with the thimble by means of a wedge or other device, for the purpose of obtaining the desired position. The axle-tree H, which is to be turned, is strapped upon the standard *b*, its inner end being centered in a cross-bar, *h*, of the frame D. The strap *i*, which holds the axle-tree, can also be vertically adjusted. The bars *e* of the frame D serve as rails for a longitudinal frame, I, which slides in the frame D, but revolves with the same. The frame I receives its longitudinal motion from one or more screws, J, which are hung in the frame D, and which carry pinions *j j* at their front ends, that are rotated by means of inner teeth on the stationary front ring B. As the frame D is revolved, the screws will also be rotated, and will feed the frame I in the desired direction, according to the nuts with which they may be in gear. The frame I has a cross-bar, *k*, which contains two sets of nuts, *m n*, (see Fig. 5,) that can alternately be brought into use, one set serving to feed the frame I forward, while the other causes it to move backward. The nuts can be adjusted by means of a small arbor, O, which carries cams whereby the nuts are set. The cutters *p p*, for turning the end of the axle-tree, are set into heads L L, which slide transversely in the frame I, and which are, by pivoted levers *r* and links *s*, connected with two bell-crank levers, M M. The levers M are both, by one pivot, *t*, pivoted to the front part of the frame I, and reach, with their front ends, into the thimble, while their short arms connect with the links. Friction-rollers *u u* are arranged on the front ends of the levers M. Springs V V serve to force the cutters against the axle-tree, and thereby, also, hold the front ends of the lever M apart. As the frame I is revolved with D around the axle-tree, and gradually fed backward, after the cutters are adjusted over the end of the axle, the motion of the cutters will be controlled by the position of the rollers *u*. The exact shape of the inner side of the thimble will thereby be transferred to the axle.

When the cutters have been fed as far backward as desired, their motion may be reversed by changing the nuts, as aforesaid, in order to smooth the axle properly.

As the axle is more rounded on top and bottom than at the sides, it will be necessary to apply the cutters with greater power at the sides. For this purpose I have pivoted to the frame I pressure-levers N, one above each lever *r*, and affixed an outer cam-edge, P, to the ring C, as shown. The back ends of the levers N rest upon the cam-edge, and are pressed upon the same by spring *w*. The cam-edge is formed to correspond about with the cross-section of the axle end. When the cutters are to be applied with greater power, the cam-edge recedes, allowing the springs *w* to press the levers N against the heads L or levers *r*.

It is obvious that instead of the compound lever M *r*, a simple lever may be used, and made to operate the same, and that instead of two cutters, one only may be used; but it is preferred to use two cutters arranged on opposite sides, for the reason that they will thus tend to counteract each other, and will therefore work with greater accuracy.

I am aware that a rotating arbor carrying a pivoted cutter-bar has been used in a machine for boring hubs; but in such machine the arbor extends directly through the hub, thus occupying the space in which the axle must be held in order to be cut on its exterior in a machine operating on the principle of mine. I do not claim, broadly, the idea of a pivoted traveling lever or cutter-bar controlled by a pattern, as such have long been used in various wood-working machines; but,

Having thus described my invention, what I claim as new, and desire to secure by Letters Patent, is—

1. A lever or series of levers carrying at one end a cutter arranged to operate on the axle, with its opposite end bearing against the inner surface of a thimble, in combination with mechanism, substantially such as described, for imparting to said lever a rotating and also a longitudinal movement, as set forth.

2. The combination and arrangement of the rotary frame D, longitudinally-sliding frame I, and transversely-sliding cutter-heads L, substantially as herein shown and described.

3. The combination, with the frame I, herein described, of the two sets of nuts *m n*, which can be adjusted to reverse the direction of the feed, as specified.

4. The cutter-heads L, levers *r*, links *s*, and the levers M, which revolve in the thimble, combined and arranged substantially as shown and described.

5. The combination of the pressure-levers N with the cutter-heads and the fixed cam P, substantially as and for the purpose herein shown and described.

6. The springs V V, combined with the levers *r*, links and levers M, to cause their simultaneous action, in the manner set forth.

WILLIAM H. HEFFLEY.

Witnesses:
ISAIAH WALKER,
CHAS. CHAMBERLAIN.